United States Patent Office 3,367,906
Patented Feb. 6, 1968

3,367,906
STABILIZED HALOGEN-CONTAINING OLEFIN POLYMER COMPOSITIONS AND STABILIZER THEREFOR
Richard B. Lund, Whippany, Arleen C. Pierce, Parsippany, and Edith Turi, Livingston, N.J., assignors to Allied Chemical Corporation, New York, N.Y., a corporation of New York
No Drawing. Original application Mar. 24, 1964, Ser. No. 354,448. Divided and this application Apr. 6, 1967, Ser. No. 646,781
4 Claims. (Cl. 260—45.7)

ABSTRACT OF THE DISCLOSURE

The present invention relates to the thermal stabilization of chlorinated ethylene polymer by the addition of α, α'-diphenoxy-2,3,5,6-tetrachloro-p-xylene or an alkyl derivative thereof.

---

This is a division of application Ser. No. 354,448, filed Mar. 26, 1964.

It is known that halogen-containing polyolefins such as polyvinylchloride, chlorinated polyethylene and chlorinated polypropylene are adversely affected when exposed to elevated temperature either during fabrication or during use. This adverse effect is usually evidenced by a darkening in color, and an increase in viscosity which is demonstrated by the increased work required to extrude or mix the material. It is generally believed that this change in viscosity is due to splitting hydrogen and/or chlorine atoms out of the polymer molecule, resulting in increased crosslinking of the polymer.

Additives have been proposed in the prior art for increasing the thermal stability of specific halogen-containing polyolefins, however, there is no consistency in the effectiveness of these stabilizers when used in different types of halogen-containing polyolefins. For instance, a number of compounds which effectively stabilize vinyl-chloride compounds have little or no stabilizing effect on chlorinated polyethylene. Another factor to be considered in the selection of a thermal stabilizer is the presence of a metal constituent in many of the prior art additives. These metal-containing stabilizers, such as metal salts, metal phenolates and organo-metallic compounds, are frequently incompatible with the polymer, causing loss of transparency, discoloration and nonhomogeneous appearance.

It is an object of the present invention to provide heat stable compositions based upon chlorinated polyethylene.

Another object of the present invention is to provide metal-free organic stabilizers for, and compatible with chlorinated polyethylenes.

Additional objects and advantages of the present invention will become apparent from the following detailed description thereof.

In accordance with the present invention it has been discovered that the thermal stability of chlorinated ethylene polymer is improved by the addition thereto of at least one member of the group consisting of α,α'-diphenoxy-2,3,5,6-tetrachloro-p-xylene and alkyl derivatives of α,α'-diphenoxy-2,3,5,6-tetrachloro-p-xylene. The new class of compounds can be represented by the formula:

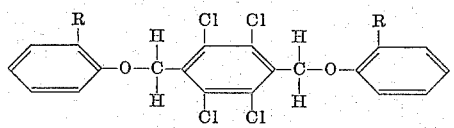

wherein R is a hydrogen or alkyl group of 1–5 carbon atoms. Illustrative of the stabilizing additives of the present invention are, for instance, α,α'-diphenoxy-2,3,5,6-tetrachloro-p-xylene:

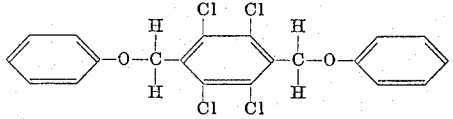

and
α,α'-bis-(2-methylphenoxy)-2,3,5,6-tetrachloro-p-xylene:

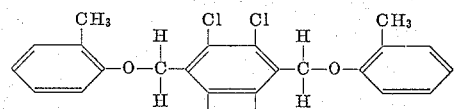

These stabilizers are effective when added to chlorinated polyethylene in amounts equal to at least about 0.5 percent by weight of the polymer, with optimum results being obtained when the stabilizers are added in amounts equal to about 1 to 10 percent by weight of the polymer.

The novel phenoxy compounds used as stabilizers in the present invention can be prepared by reacting an alkali phenolate compound of the formula:

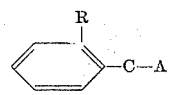

wherein R is either hydrogen or an alkyl group of 1–5 carbon atoms and A is an alkali cation, for instance either sodium phenolate or a derivative thereof substituted in the orthoposition by an alkyl group, with α,α'-2,3,5,6-hexachloro-p-xylene in accordance with the following equation:

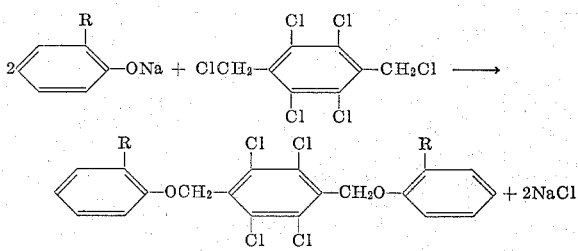

wherein R is an alkyl group of 1–5 carbon atoms.

The stabilizers can be employed with other common additives used in halogenated polyolefin formulations, such as stabilizers against the effects of radiation, fillers, pigments and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer, originally entirely soluble in monochlorobenzene, which is no longer soluble after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperatures.

The chlorinated polyethylene stabilized by our invention can contain from about 20 to about 80% by weight chlorine. In a preferred embodiment, the chlorinated polyethylene is randomly chlorinated whereby it is essentially amorphous and has a low brittle point (glass transition temperature), such as about 0° C. or lower at 20 percent chlorine content and rising with chlorine content to over 185° C. at 80 percent chlorine content. Particularly suitable polyethylenes to be chlorinated for use in our invention are those produced as described in Example 6 of British Patent No. 858,674, of Jan. 11, 1961. Such polyethylenes can be chlorinated with advantage for use in our invention by the process described in Example 3 of French Patent No. 1,316,044 of Dec. 17, 1962.

The polymerization process of British Patent No. 858,674 results generally in a polymer of high molecular weight such as 500,000 to 5,000,000 average molecular weight, and of density of about 0.935 to 0.96 gm./cm.$^3$ at 25° C. The molecular weight of the polymer can be reduced by a thermal treatment, for instance in accordance with the process outline at page 12, lines 73–77 of the above-identified British Patent No. 858,674. The molecular weight of the resulting polyethylenes will be in the range of about 20,000 to 300,000, and the density will be about 0.94–0.95 gm./cm.$^3$ at 25° C.

The foregoing molecular weights are calculated from the intrinsic viscosity of a solution of the polymer in Decalin, according to the method of P. S. Francis et al. (Journal of Polymer Science, vol. 31, pp. 453–466), i.e. by using the following formula:

$$[\eta] = 6.77 \times 10^{-4} \times M^{0.67}$$

where $[\eta]$ is the instrinsic viscosity in deciliters per gram, and M is the average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D–1043–61T), as the temperature below which the stiffness sharply increases so that the sample becomes brittle. A typical stiffness modulus at the glass transition temperature for the subject chlorinated polyethylenes is $1.45 \times 10^4$ p.s.i. (i.e. $10^9$ dynes/cm.$^2$).

One preferred group of randomly chlorinated polyethylenes of chlorine content in the range 20–80 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.1 to about 1.5 deciliters per gram, indicating lower molecular weight of the polymer. These intrinsic viscosities are determined upon a 0.1 gram per 100 ml. solution in o-dichlorobenzene at 100° C.

The following examples describe completely specific embodiments of our invention and illustrate the best mode contemplated by us of carrying out our invention; but are not to be interpreted as limiting the invention to all details of the examples.

The samples tested consisted of unstabilized controls and compositions containing stabilizer in an amount equal to 4% by weight of the weight of the chlorinated polyethylene. In all tests the chlorinated polyethylene sample was ground to about —40 mesh powder. The stabilizer was dissolved in a volatile solvent, such as methanol. This solution was edded to the powdered polymer and the mixture was stirred under $N_2$ at ambient temperatures, until completely dried.

About 2–3 grams of each prepared sample were heated in open test tubes in a block heater at 200° C. for 60 minutes, except where specified otherwise. This heat treatment of the sample resulted in the thermal breakdown of the polymer into a certain percentage of a crosslinked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken as 100% whiteness.

The amount of crosslinked product or gel formed as a result of the heat treatment was determined in accordance with the following procedure.

About 0.2 to 0.3 gram of the heat treated polymer was weighed into a tared stainless steel basket made of 250 mesh screen. This basket was placed into a Soxhlet extractor containing approximately 125 ml. monochlorobenzene, and refluxed for six hours. The noncrosslinked product was extracted, permitting gravimetric determination of the crosslinked gel. During the extraction the system was kept under slow $N_2$ stream to prevent oxidation.

*Examples 1–3*

In Table I comparative test results are shown to demonstrate the advantages of the stabilizers of the invention. The resin used in the tests was a chlorinated polyethylene containing 67.3 percent chlorine and having an intrinsic viscosity of 0.7 and essentially random chlorine substitution, with a glass transition temperature of about 150° C. Heat treatment was conducted at 210° C. for 30 minutes.

TABLE I

| Stabilizer | Percent Whiteness | Percent Gel |
| --- | --- | --- |
| Unstabilized resin control | 12 | 3 |
| α,α'-diphenoxy-2,3,5,6-tetrachloro-p-xylene | 15 | 0 |
| α,α'-bis(2-methylphenoxy)-2,3,5,6-tetrachloro-p-xylene | 16 | 0 |

In Table II comparative results are shown with the same resin base used for the tests shown in Table I, the heat treatment here being 230° C. for 30 minutes.

TABLE II

| Stabilizer | Percent Whiteness | Percent Gel |
| --- | --- | --- |
| Unstabilized resin control | 4 | 16 |
| α,α'-bis(2-methylphenoxy)-2,3,5,6-tetrachloro-p-xylene | 6 | 5 |

In the following, examples are given showing exemplary processes for the preparation of each of the novel compounds of the invention.

*Example 4*

2.3 parts by weight sodium were added to a solution of 9.4 parts by weight phenol in 100 parts by volume dry benzene. The resulting mixture was heated with reflux for one hour. The formed solid was removed by filtration and dissolved in 150 parts by volume dimethylformamide with heating. A 16.0 parts by weight portion of α,α'-2,3,5,6-hexachloro-p-xylene was added to the solution and the reaction mixture heated with reflux with stirring for 47 hours. The reaction mixture was then cooled to room temperature and the resulting solid (3.0 parts by weight) was removed by filtration. This solid had a melting point of 198.5–200° C. and was confirmed to be α,α'-diphenoxy-2,3,5,6-tetrachloro-p-xylene by elemental analysis and infrared spectroscopy.

*Example 5*

2.3 parts by weight sodium were added to a solution of 10.6 parts by weight o-cresol in 100 parts by volume dry benzene. The resulting mixture was heated with reflux for one hour. The formed solid was removed by filtration and dissolved in 150 parts by volume dimethylformamide with heating. A 3.2 parts by weight portion of α,α'-2,3,5,6-hexachloro-p-xylene was added to the solution and the reaction mixture was heated with reflux with stirring for 28 hours. The reaction mixture was then cooled to room temperature and the resulting solid removed by filtration. This solid was recrystallized from dioxane to give 4.6 parts by weight α,α'-bis(2-methylphenoxy)-

2,3,5,6-tetrachloro-p-xylene having a melting point of 237.5–239° C. The compound was confirmed by elemental analysis and infrared spectroscopy.

We claim:

1. A composition comprising a chlorinated polyethylene, and a stabilizing compound having the formula:

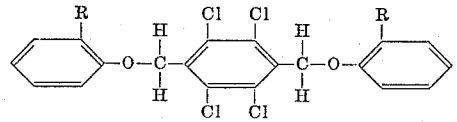

wherein R is a member of the group consisting of hydrogen and alkyl of 1–5 carbon atoms.

2. The composition of claim 1, wherein said chlorinated polyethylene is a chlorinated homopolymer of ethylene having a chlorine content of 20–80% by weight of said chlorinated polyethylene, having a low glass transition temperature below 0° C. for a polymer of 20% chlorine content and rising up to over 185° C. for a polymer of 80% chlorine content, and said stabilizing compound is present in a concentration of 0.5 to 10% by weight of said chlorinated polyethylene.

3. The composition of claim 2, wherein said stabilizing compound is α,α'-bis(2-methylphenoxy)-2,3,5,6-tetrachloro-p-xylene.

4. The composition of claim 2, wherein said stabilizing compound is α,α'-diphenoxy-2,3,5,6-tetrachloro-p-xylene.

References Cited

UNITED STATES PATENTS 2,906,727  9/1959  Gordon _____ 260—45.7
3,312,657  4/1967  Lund et al. _____ 260—45.7 X DONALD E. CZAJA, *Primary Examiner.*

M. J. WELSH, *Assistant Examiner.*